July 15, 1941.　　　K. W. KUBAN　　　2,249,213
SLICING MACHINE
Filed Dec. 29, 1938　　　5 Sheets-Sheet 1

Fig. 1.

INVENTOR.
Kurt W. Kuban
BY Earl F. Chappell
ATTORNEYS

July 15, 1941.  K. W. KUBAN  2,249,213
SLICING MACHINE
Filed Dec. 29, 1938  5 Sheets-Sheet 3

INVENTOR.
Kurt W. Kuban
BY Earl & Chappell
ATTORNEYS

Patented July 15, 1941

2,249,213

UNITED STATES PATENT OFFICE 2,249,213

SLICING MACHINE

Kurt W. Kuban, Battle Creek, Mich., assignor, by mesne assignments, to The Central National Bank at Battle Creek, Battle Creek, Mich., a national-banking corporation of the United States Application December 29, 1938, Serial No. 248,169

36 Claims. (Cl. 146—88)

This invention relates to improvements in slicing machines.

The main objects of this invention are:

First, to provide a slicing machine of the band saw type which is well adapted for the slicing of bread.

Second, to provide in a slicing machine of the band saw type means whereby the saws may be quickly and easily adjusted to vary the thickness of the slices.

Third, to provide a multiple saw guide unit in which all of the saw guide members are simultaneously and accurately adjusted toward or from each other.

Fourth, to provide a structure of this character having an indicia member that indicates to the workmen the extent of adjustment or the spacing of the saws.

Fifth, to provide band saw adjusting means whereby a plurality of band saws may be simultaneously adjusted to vary the distance between the effective reaches of the saws and effectively support or guide them in their adjusted position.

Sixth, to provide multiple band saw guide units which may be readily swung to and from operative position to facilitate the placing or removal of the saws as may be necessary for assembling or replacement after breakage or for sharpening.

Seventh, to provide a structure having these various advantages which is comparatively simple in its parts and very durable.

Objects relating to details and economies of the invention will appear from the description to follow. The invention is defined and pointed out in the claims.

A preferred embodiment of the invention is illustrated in the accompanying drawings, in which:

Fig. 3 is an enlarged fragmentary view partially in section on line 3—3 of Fig. 2.

In the accompanying drawings I have shown my improvements as embodied in a band saw type of bread slicing machine. However, I have illustrated only such parts thereof as seem necessary or desirable to disclose my invention in an operative embodiment.

The numeral 1 designates the frame, 2 the feed conveyor or way along which the loaves of bread are advanced to the slicing machine, and 4 the delivery conveyor or way at the rear of the slicing mechanism. The means for feeding and delivering the work are not illustrated.

The band saws or blades 5 are supported by the pulleys 6 and 7, the pulley 6 being a driven pulley. These saws or blades are crossed intermediate the pulleys, the crossing zone being in the plane or travel of the work. The pulleys are of cylindrical type of uniform diameter so that the blades may be adjusted longitudinally of the pulleys. 8 represents a motor which is connected to the pulley 6 by suitable belts and pulleys designated generally by the numeral 9, see Fig. 1.

In the slicing of bread it is frequently desirable to vary the thickness of the slices and this I accomplish by multiple saw guide units arranged in opposite pairs. The saw guide units each comprises a plurality of guide members 10 slotted at 11 to receive one of the reaches of a saw or blade, guiding it in proper relation to the other saws and reaches thereof. It will be observed that each reach of a saw constitutes a blade or cutting section as distinguished from having only one reach effective at one time. The work is presented to the blades at their crossing zone so that one reach is traveling upward when the adjacent reaches are traveling downward, thus minimizing and substantially balancing the displacing action of the blades on the work.

Figure 4:
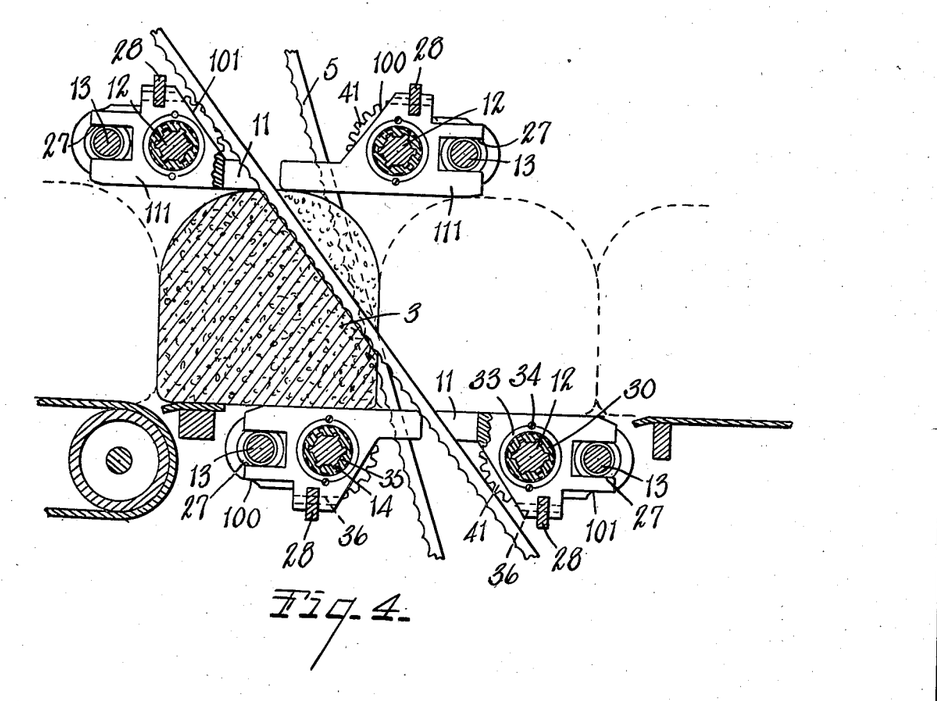
Fig. 4 is a fragmentary view partially in section on line 4—4 of Fig. 2.
Figure 5:
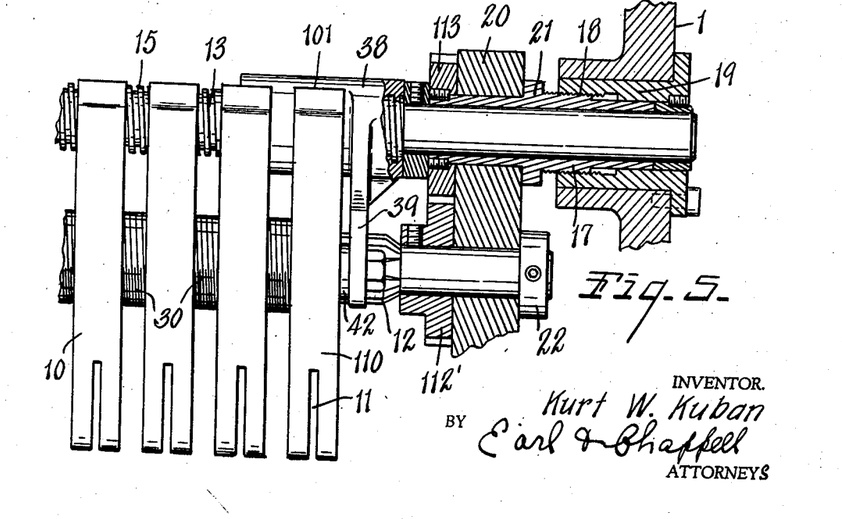

The saw guide units are arranged in opposed pairs, one pair being disposed above and the other disposed below the crossing zone of the saws. It will be observed by reference to Fig. 4 that the upper pair of units is arranged in an inverted position as compared to the lower pair of units. In the main the units are duplicates but for purposes to be hereinafter made clear I designate one unit of the pair by the numeral 100 and the other by the numeral 101. The unit 101 is mounted for longitudinal adjustment relative to the unit 100.

Each unit includes a main shaft 12 and an auxiliary shaft 13. It will be understood that the words "main" and "auxiliary" are used mainly for convenience in distinguishing the shafts inasmuch as both shafts function to the same end, that is, as means for effective actuation of the saw guides although in some instances, particularly where there are relatively few saws involved, the auxiliary shaft may be omitted. The main shaft is splined as indicated at 14 or otherwise formed on non-circular section, and the auxiliary shaft is provided with reversely threaded portions 15.

Figures 2, 5:
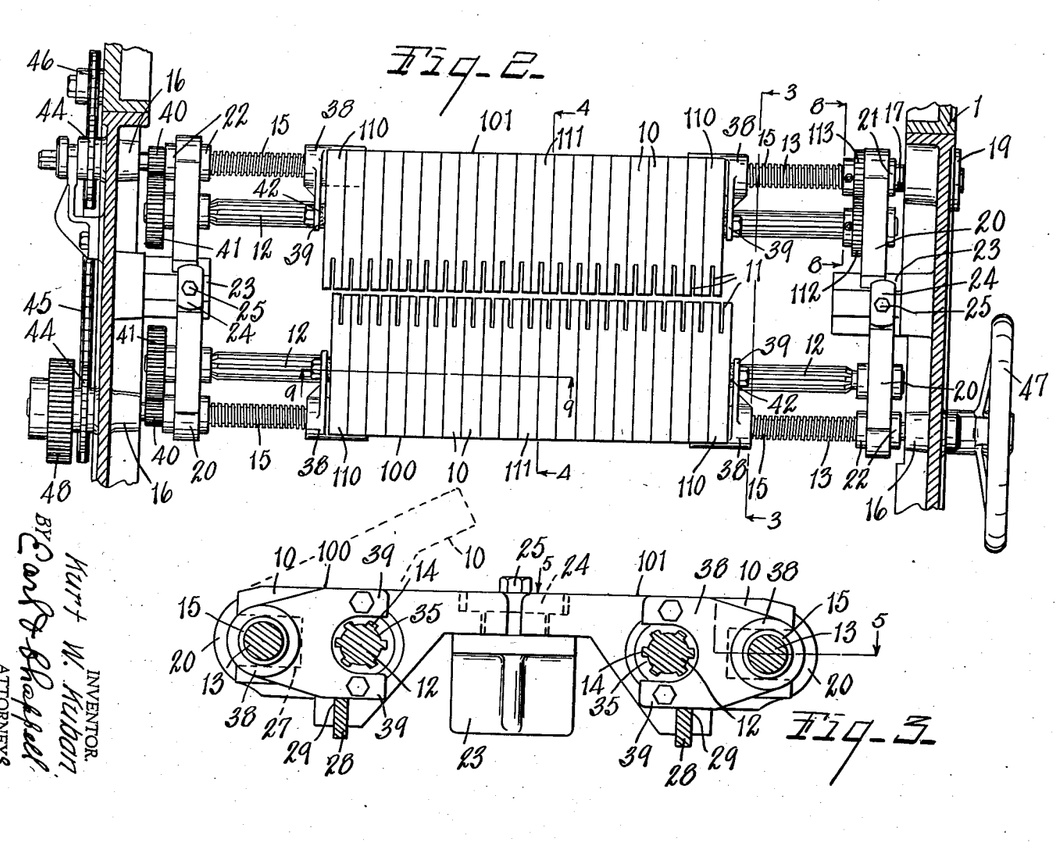
Fig. 2 is an enlarged fragmentary view mainly in section on line 2—2 of Fig. 1.
Fig. 5 is an enlarged detail view partially in section on line 5—5 of Fig. 3.

The auxiliary shafts are supported on the main frame, and the auxiliary shaft for the unit 100 is provided with bearings conventionally indicated at 16 while the auxiliary shaft for the unit 101 is supported at one end by a bearing indicated at 16, see Fig. 2, and at the other end by an axially adjustable bearing sleeve 17 having a threaded portion 18 engaged in a bushing 19 carried by the main frame, see Fig. 5. The main shafts 12 are journaled in the brackets 20, the brackets for the unit 100 being swingable on the shaft 13 and positioned thereon by means of the collar 22. The brackets for the unit 101 are swingable at one end directly on the shaft 13 and at the other end on the sleeve 17 which is provided with a flange 21 providing a thrust member, see Fig. 5.

These brackets are designed to rest on the supports 23 projecting inwardly from the frame members and are secured thereon by the clips 24, the clips being of the turn-button type so that the screws 25 may be loosened and the clips turned to permit the swinging of the supports and the parts carried thereby to the dotted position shown in Fig. 3.

The guide members 10 are provided with internal shouldered bores or recesses 26 through which the shaft 12 is disposed, this recess being of substantially greater diameter than the shaft. It will be noted by reference to Fig. 6 that the guide members have slot-like recesses 27 in their outer ends receiving the auxiliary shafts 13. To further support and steady the guide members I provide cross bars 28 which are carried by the swinging supports 20 and engage slot-like recesses 29 in the guide members. These cross bars are arranged in parallel relation to the shafts.

Figure 9:
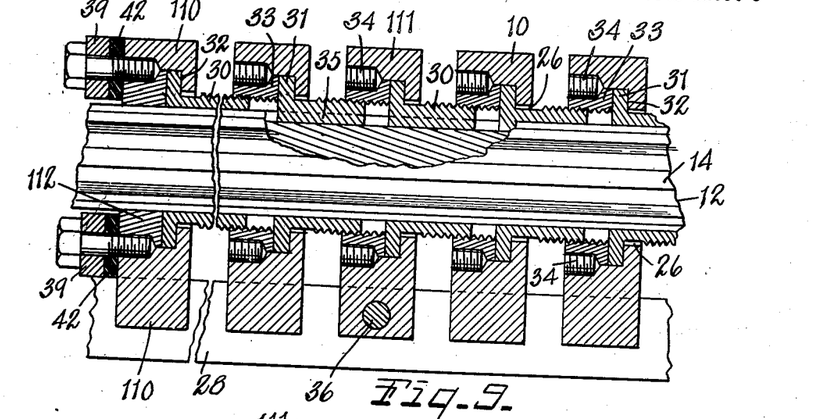
Fig. 9 is an enlarged fragmentary view partially in section on line 9—9 of Fig. 2 showing details of the adjusting means for the saw guide members.
Figure 10:
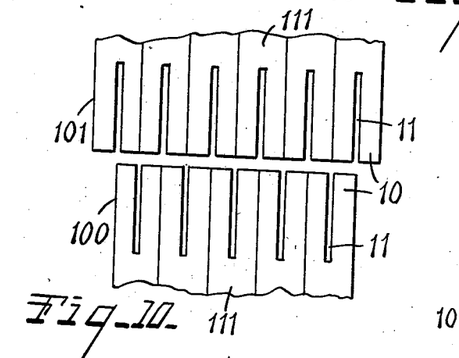
Fig. 10 is a fragmentary plan view of the saw guide members of an associated pair of the units in fully collapsed position.
Figure 11:
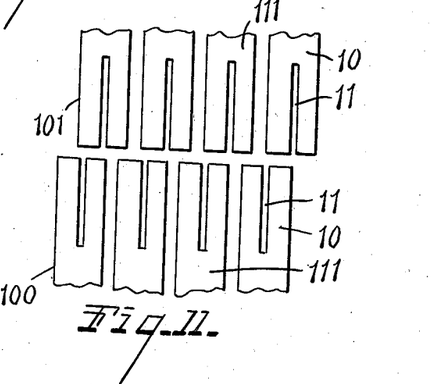
Fig. 11 is a fragmentary view showing the position that the saw guide members of the unit would be in relative to each other in the event that the members were merely separated or spaced and not shifted as I have described.
Figure 12:
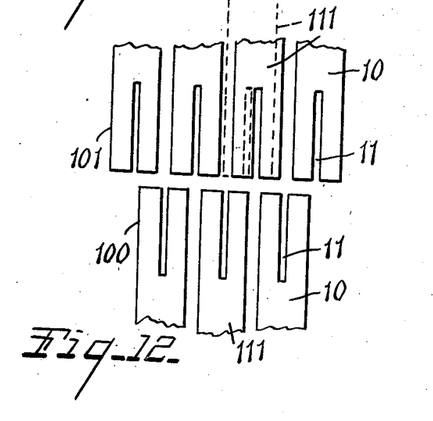
Fig. 12 is a fragmentary plan view of the pair of units with the saw guide members in spaced relation and one unit shifted longitudinally of the other unit as well as spacing the members thereof, dotted lines indicating the position of the fixed member in fully collapsed position.

Guide member adjusting sleeves 30 are provided having splines 35 engaging splines 14 on the shaft 12, as best shown in Figs. 3 and 9. The sleeves are externally threaded at one end and are provided with annular flanges 31 at the other end disposed within the recesses in engagement with the shoulders 32 of the guide members and rotatably secured to the guide members by means of internally threaded nuts 33 which are secured within the guide member recesses by means of screws 34. By reference to Fig. 9 it will be noted that the outer guide member, which I designate for convenience by the numeral 110, has an unthreaded collar 112 secured therein to coact with the shoulder, rotatably connecting the sleeves to the guide member.

The central guide member of each unit 10, designated for convenience 111, is fixed to the cross bar by suitable means as the pin 36. The threads 15 of the shaft on opposite sides of this central member are reversed so that on rotation of the shaft the guide members are moved toward and from the central fixed members.

It will be understood that by rotating the shaft 12 the guide members are moved toward and away from each other to vary the spacing of the corresponding saw reaches. To relieve or minimize the guide members of binding torsional stresses due to their threaded actuation, I provide tension or thrust members 38 which have threaded engagement with the reversely threaded portions 15 of the shaft 13, and are provided with arms 39 which are secured to the outer guide members of the unit.

The shafts 13 are provided with gears 40 meshing with gears 41 on the shaft 12 so that the shafts are simultaneously rotated and the proportion of the gears is such that when the shafts are actuated the tension members or thrust members 38 actuate it to widen the spaces between the guide members, a pull being exerted on the outer members and, through the connection described, imparted to the other members which greatly reduces the power required to adjust the members. The reverse action occurs when the guide members are closed up or adjusted more closely to each other.

The threads on the shaft 13 and the threads on the sleeves 30 are in proper ratio. The gears are in corresponding ratio, one of the objects being to secure a structure which can be easily adjusted with a minimum of stress on the parts. Owing to the fact that the units are arranged in opposed pairs, and that the central guide members of each pair are fixed relative to the other members, it is necessary, in order to secure the desired accuracy in spacing of the saws or cutters, to shift one of the guide units of each coacting pair longitudinally as a unit in effecting an adjustment.

This I accomplish in the embodiment of my invention illustrated by means of the bearing sleeve 17 which, as described, is threaded into the member 19 carried by the frame and provided with a thrust member 21 engaging the bracket 20 as shown in Fig. 5. The sleeve 17 is connected to the shaft 12 by means of the gears 112' and 113, the gear 112' being pinned to the shaft 12 and the gear 113 being pinned to the bearing sleeve so that as the shafts are rotated to space the guide members one unit of each cooperating pair of units is moved longitudinally the desired amount to maintain the spacing of the fixed guide members 111. The pitch of the thread on the sleeve is in proper ratio to the threads on the shaft 12 to secure this result. It would be possible, of course, to provide for manual adjustment of the bearing sleeve 17 or to provide other means for longitudinally adjusting one of the units of a pair, but by the simple expedient I have provided means for simultaneously shifting one of the units with the spacing adjustment of its saw guide members. The advantages of this will be obvious.

To avoid the necessity for great accuracy the yielding or cushioning members 42 are arranged between the arms of the thrust members and the guide members 110, see Fig. 9. With this arrangement of parts it is found that the adjustment can be very easily acomplished and with a minimum of strain upon the parts.

The shafts 13 in the assembly illustrated constitute driving shafts and they are provided with sprocket wheels 44 with which the sprocket chains 45 coact, idlers 46 being provided at one end of these sprocket wheels. The sprocket chains are driven from the hand wheel 47 having gear connections indicated at 48 and 49 to drive one of the shafts 13.

Figure 1:
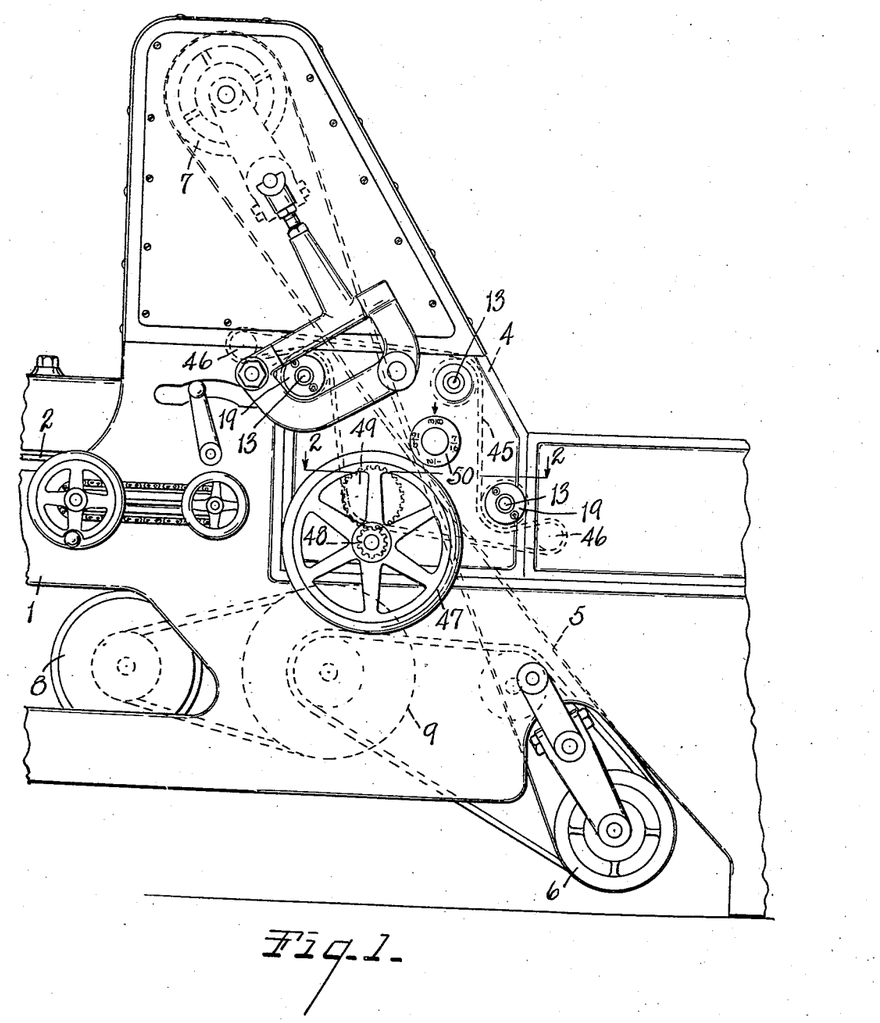
Fig. 1 is a fragmentary side elevation of a slicing machine embodying the features of the invention, parts being shown conventionally for convenience in illustration.

To facilitate the adjustment of the mechaanism I provide an indicia member 50 which, as shown in Fig. 1, has the numerals ½, ⅞, ⅜ and ⁹⁄₁₆. This indicia member is driven through a train of gears indicated by the numeral 51 in Fig. 8, the gearing being such that the indicia member indicates the spacing between the saws.

Figures 6, 7, 8:
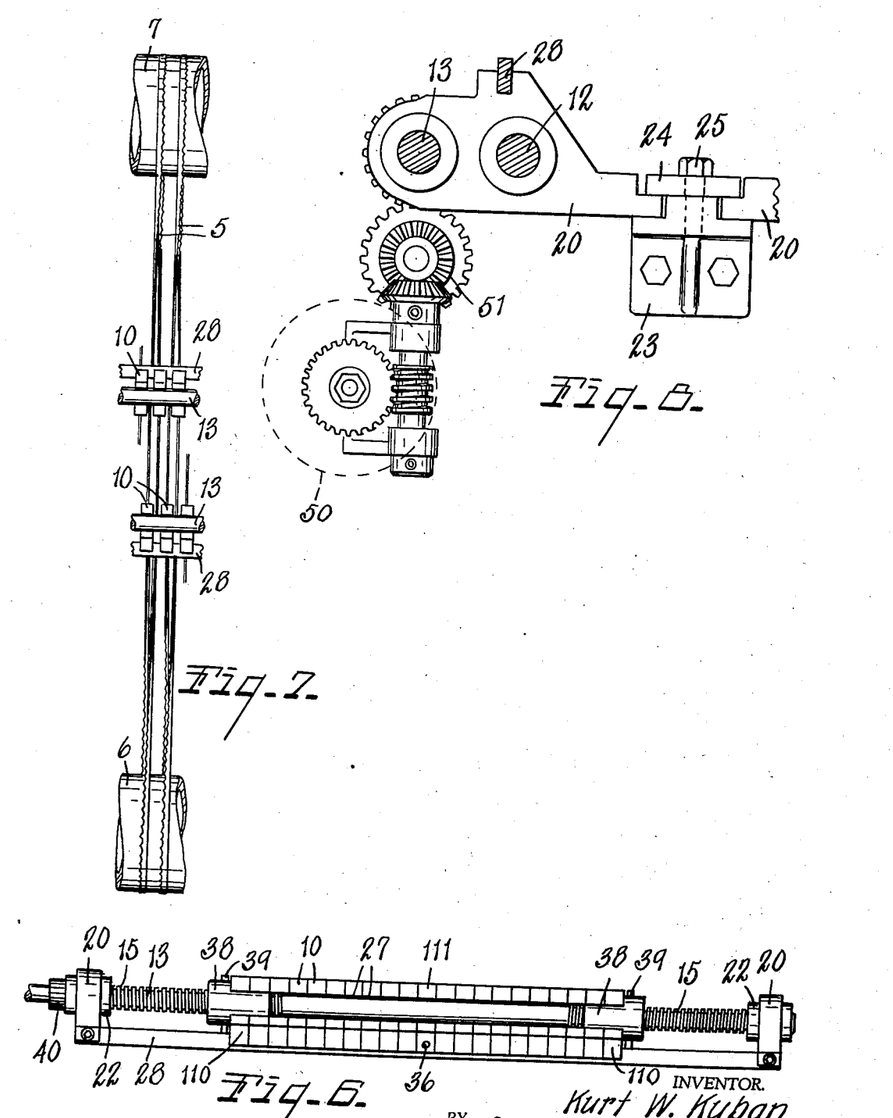
Fig. 6 is a rear elevation of one of the guide units with the guide members in fully collapsed position.
Fig. 7 is a fragmentary elevation showing the relation of the band saws to the pulleys and to the guide units.
Fig. 8 is a fragmentary view sectioned on line 8—8 of Fig. 2 showing details of the guide mechanism and means for driving the indicia element.

I preferably show a combined gear and worm means in Fig. 8 as that enables the fine adjustment and also serves to hold the parts in adjusted position, making it possible to eliminate lost motion.

My improved saw guide mechanism is highly practical and is capable of very accurate and easy adjustment. The saws being mounted upon the cylindrical pulleys quickly adjust themselves at their point of engagement with the pulleys to the variations in spacing of the saw reaches. As the reaches of the saws are correspondingly adjusted no undue strain is placed on the saws.

I have illustrated and described my improvements in one practical commercial embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent, is:

1. In a slicing machine, the combination of a plurality of crossed band saws, elongated cylindrical driving and supporting pulleys for said band saws and with which said saws are associated to permit the saws being moved axially of the pulleys, opposed pairs of saw guide units disposed above and below the crossing zone of the saws and each comprising saw guide members slotted to receive the saws, a splined main shaft and a reversely threaded auxiliary shaft disposed in parallel relation, said guide members having shouldered openings receiving said main shaft and end slots receiving said auxiliary shaft, supporting brackets for said main shaft swingably mounted on the auxiliary shaft, means for supporting the swinging ends of said brackets in operative position, a cross bar on said brackets with which said guide members have slotted engagement disposed in parallel relation to said shafts, the central guide member being fixed to the cross bar, externally threaded sleeves having splined engagement with said main shaft and having flanges at one end disposed within the openings of said guide members, nut members arranged within said guide member openings to coact with the threaded sleeves of adjacent guide members, said nut members coacting with said sleeve shoulders to rotatably connect said sleeves to said guide members, tension members connected to the outer of the unit guide members and having threaded engagement with said reversely threaded shaft, gear connections for said auxiliary shafts and the main shaft of the units, means for longitudinally adjusting one guide unit relative to the other, and driving means for the auxiliary shafts of the several units.

2. In a slicing machine, the combination of a plurality of crossed band saws, elongated cylindrical driving and supporting pulleys for said band saws and with which said saws are associated to permit the saws being moved axially of the pulleys, opposed pairs of saw guide units disposed above and below the crossing zone of the saws and each comprising saw guide members slotted to receive the saws, a splined main shaft and a reversely threaded auxiliary shaft disposed in parallel relation, said guide members having shouldered openings receiving said main shaft and end slots receiving said auxiliary shaft, externally threaded sleeves having splined engagement with said main shaft and having flanges at one end disposed within the openings of said guide members, nut members arranged within said guide member openings to coact with the threaded sleeves of adjacent guide members, said nut members coacting with said sleeve shoulders to rotatably connect said sleeves to said guide members, tension members connected to the outer of the unit guide members and having threaded engagement with said reversely threaded shaft, gear connections for said auxiliary shafts and the main shaft of the units, threaded means for longitudinally adjusting one guide unit of each pair simultaneously with the adjustment of the guide members relative to each other, and driving means for the auxiliary shaft of the several units.

3. In a slicing machine, the combination of a plurality of crossed band saws, elongated cylindrical driving and supporting pulleys for said band saws and with which said saws are associated to permit the saws being moved axially of the pulleys, opposed pairs of saw guide units disposed above and below the crossing zone of the saws and each comprising saw guide members slotted to receive the saws, a splined main shaft and a reversely threaded auxiliary shaft disposed in parallel relation, said guide members having shouldered openings receiving said main shaft and end slots receiving said auxiliary shaft, externally threaded sleeves having splined engagement with said main shaft and having flanges at one end disposed within the openings of said guide members, nut members arranged within said guide member openings to coact with the threaded sleeves of adjacent guide members, said nut members coacting with said sleeve shoulders to rotatably connect said sleeves to said guide members, tension members connected to the outer of the unit guide members and having threaded engagement with said reversely threaded shaft, gear connections for said auxiliary shafts and the main shaft of the units, means for longitudinally adjusting one guide unit as a unit relative to the other unit of the pair, driving means for the auxiliary shafts of the several units, and an indicia member having driving connection with said driving means.

4. The combination of a plurality of band saws, elongated cylindrical driving and supporting pulleys for said band saws and with which said saws are associated to permit the saws being moved axially of the pulleys, opposed pairs of saw guide units each comprising saw guide members, a main shaft and a reversely threaded auxiliary shaft disposed in parallel relation, said guide members being recessed to receive said shafts, supporting brackets for said main shaft swingably mounted on the auxiliary shaft, means for supporting the swinging ends of said brackets in operative position, a cross bar on said brackets with which said guide members other than the central member have sliding engagement disposed in parallel relation to said shafts, the central guide member being fixed to the cross bar, threaded sleeves having splined engagement with said main shaft and rotatable engagement with one guide member and threaded engagement with an adjacent guide member, tension members connected to the outer of the unit guide members and having threaded engagement with said reversely threaded shaft, driving connections for the shafts of the units, means for longitudinally adjusting one guide unit as a unit relative to the other unit of the pair, and driving means for the auxiliary shafts of the several units.

5. The combination of a plurality of band saws, elongated cylindrical driving and supporting pulleys for said band saws and with which said saws are associated to permit the saws being moved axially of the pulleys, opposed pairs of saw guide units each comprising saw guide members, a main shaft and a reversely threaded auxiliary shaft disposed in parallel relation, said guide members being recessed to receive said shafts, a cross bar with which said guide members other than the central member have sliding engagement disposed in parallel relation to said shafts, the central guide member being fixed to the cross bar, threaded sleeves having splined engagement with said main shaft and rotatable engagement with one guide member and threaded engagement with an adjacent guide member, tension members connected to the outer of the unit guide members and having threaded engagement with said reversely threaded shaft, driving connections for the shafts of the units, threaded means for longitudinally adjusting one guide unit of each pair simultaneously with the adjustment of the guide members relative to each other, and driving means for the auxiliary shafts of the several units.

6. The combination of a plurality of band saws, elongated cylindrical driving and supporting pulleys for said band saws and with which said saws are associated to permit the saws being moved axially of the pulleys, opposed pairs of saw guide units each comprising saw guide members, a main shaft and a reversely threaded auxiliary shaft disposed in parallel relation, said guide members being recessed to receive said shafts, threaded sleeves having splined engagement with said main shaft and rotatable engagement with one guide member and threaded engagement with an adjacent guide member, tension members connected to the outer of the unit guide members and having threaded engagement with said reversely threaded shaft, driving connections for the shafts of the units, threaded means for longitudinally adjusting one guide unit of each pair simultaneously with the adjustment of the guide members relative to each other, and driving means for the auxiliary shafts of the several units.

7. The combination of a plurality of band saws, elongated cylindrical driving and supporting pulleys for said band saws and with which said saws are associated to permit the saws being moved axially of the pulleys, opposed pairs of saw guide units each comprising saw guide members, a main shaft and a reversely threaded auxiliary shaft disposed in parallel relation, said guide members being recessed to receive said shafts, threaded sleeves having splined engagement with said mian shaft and rotatable engagement with one guide member and threaded engagement with an adjacent guide member, tension members connected to the outer of the unit guide members and having threaded engagement with said reversely threaded shaft, driving connections for the shafts of the units, driving means for the auxiliary shafts of the several units, and an indicia member having driving connection with said driving means.

8. The combination of a plurality of band saws, opposed pairs of saw guide units disposed to coact with the reaches of the saws and comprising saw guide members, a main shaft and an auxiliary shaft, supporting brackets for said main shaft swingably mounted on the auxiliary shaft, means for supporting the swinging ends of said brackets in operative position, a cross bar on said brackets with which said guide members other than the central member have sliding engagement disposed in parallel relation to said shafts, the central guide member being fixed to the cross bar, threaded sleeves having splined engagement with said main shaft and rotatable engagement with one guide member and threaded engagement with an adjacent guide member, tension members connected to the outer of the unit guide members and having threaded engagement with said reversely threaded shaft, means for longitudinally adjusting one guide unit as a unit relative to the other unit of the pair, and driving means for simultaneously driving said shafts.

9. The combination of a plurality of band saws, opposed pairs of saw guide units disposed to coact with the reaches of the saws and comprising saw guide members, a main shaft and a reversely threaded auxiliary shaft, threaded sleeves having splined engagement with said main shaft and rotatable engagement with one guide member and threaded engagement with an adjacent guide member, tension members connected to the outer of the unit guide members and having threaded engagement with said reversely threaded shaft, and driving means for simultaneously driving said shafts.

10. The combination of a plurality of band saws, opposed pairs of saw guide units disposed to coact with the reaches of the saws and comprising saw guide members, a main shaft and a reversely threaded auxiliary shaft, threaded sleeves having splined engagement with said main shaft and rotatable engagement with one guide member and threaded engagement with an adjacent guide member, tension members connected to the outer of the unit guide members and having threaded engagement with said reversely threaded shaft, driving means for simultaneously driving said shafts, and an indicia member having driving connection with said driving means.

11. In a slicing machine, the combination of a pluraltiy of band saws, opposed saw guide units disposed to coact with the reaches of the saws and comprising a plurality of saw guide members, a shaft, a cross bar with which said guide members other than the central member have sliding engagement disposed in parallel relation to said shaft, the central guide member being fixed to the cross bar, and threaded sleeves having splined engagement with said shaft and flange and annular groove rotatable connection with one guide member and threaded connection with an adjacent guide member.

12. In a slicing machine, the combination of a plurality of band saws, opposed saw guide units disposed to coact with the reaches of the saws and comprising a plurality of saw guide members, a shaft, and threaded sleeves having splined connection with said shaft and flange and annular groove rotatable connection with one guide member and threaded engagement with an adjacent guide member.

13. A multiple saw guide unit comprising a plurality of saw guide members slotted to receive the saws to be guided, a splined main shaft and a reversely threaded auxiliary shaft disposed in parallel relation, said guide members having shouldered openings receiving said main shaft and end slots receiving said auxiliary shaft, supporting brackets for said main shaft swingably mounted on the auxiliary shaft, means for supporting the swinging ends of said brackets in operative position, a cross bar on said brackets to which the central member is fixed and with which the other guide members have sliding engagement, externally threaded sleeves having splined engagement with said main shaft and having flanges at one end disposed within the openings of said guide members, nut members arranged within said guide member openings to coact with the threaded sleeves of adjacent guide members, said nut members coacting with said sleeve shoulders to rotatably connect said sleeves to said guide members, tension members connected to the outer of the unit guide members and having threaded engagement with said reversely threaded shaft, and gear connections for said shafts.

14. A multiple saw guide unit comprising a plurality of saw guide members slotted to receive the saws to be guided, a splined main shaft and a reversely threaded auxiliary shaft disposed in parallel relation, said guide members having shouldered openings receiving said main shaft and end slots receiving said auxiliary shaft, a cross bar to which the central guide member is fixed and with which the other guide members have sliding engagement, externally threaded sleeves having splined engagement with said main shaft and having flanges at one end disposed within the openings of said guide members, nut members arranged within said guide member openings to coact with the threaded sleeves of adjacent guide members, said nut members coacting with said sleeve shoulders to rotatably connect said sleeves to said guide members, tension members connected to the outer of the unit guide members and having threaded engagement with said reversely threaded shaft, and gear connections for said shafts.

15. A multiple saw guide unit comprising a plurality of saw guide members slotted to receive the saws to be guided, a splined main shaft and a reversely threaded auxiliary shaft disposed in parallel relation, said guide members having shouldered openings receiving said main shaft and end slots receiving said auxiliary shaft, externally threaded sleeves having splined engagement with said main shaft and having flanges at one end disposed within the openings of said guide members, nut members arranged within said guide member openings to coact with the threaded sleeves of adjacent guide members, said nut members coacting with said sleeve shoulders to rotatably connect said sleeves to said guide members, tension members connected to the outer of the unit guide members and having threaded engagement with said reversely threaded shaft, and gear connections for said shafts.

16. A multiple saw guide comprising saw guide members, a main shaft and a reversely threaded auxiliary shaft disposed in parallel relation, supporting brackets for said main shaft swingably mounted on the auxiliary shaft, means for supporting the swinging ends of said brackets in operative position, a cross bar on said brackets with which said guide members other than the central member have sliding engagement disposed in parallel relation to said shafts, threaded sleeves having splined engagement with said main shaft and rotatable engagement with one guide member and threaded engagement with an adjacent guide member, tension members connected to the outer of the unit guide members and having threaded engagement with said reversely threaded shaft, and driving connections for said shafts.

17. A multiple saw guide unit comprising saw guide members, a main shaft and a reversely threaded auxiliary shaft disposed in parallel relation, a cross bar to which the central guide member is fixed, the other guide members having sliding engagement with said cross bar, threaded sleeves having splined engagement with said main shaft and rotatable engagement with one guide member and threaded engagement with an adjacent guide member, tension members connected to the outer of the unit guide members and having threaded engagement with said reversely threaded shaft, and driving connections for said shafts.

18. A multiple saw guide unit comprising guide members, a main shaft and a reversely threaded auxiliary shaft disposed in parallel relation, threaded sleeves having splined engagement with said main shaft and rotatable engagement with one guide member and threaded engagement with an adjacent guide member, tension members connected to the outer of the unit guide members and having threaded engagement with said reversely threaded shaft, and driving connections for said shafts.

19. A multiple saw guide unit comprising a plurality of saw guide members, a shaft, said guide members having shouldered openings receiving said shaft, threaded sleeves having splined engagement with said shaft and having flanges at one end disposed within the openings of said guide members, nut members arranged within said guide member openings, said shoulders, nut members and flanges coacting to rotatably connect said sleeves to said guide members, tension members connected to the outer of the unit guide members, and means for actuating said tension members simultaneously with the actuation of said shaft.

20. A multiple saw guide unit comprising a plurality of saw guide members, a shaft, said guide members having shouldered openings receiving said shaft, threaded sleeves having splined engagement with said shaft and having flanges at one end disposed within the openings of said guide members, and nut members arranged within said guide member openings, said flanges, nut members and shoulders coacting to rotatably connect said sleeves to said guide members.

21. In a structure of the class described, a multiple saw guide unit comprising a shaft, threaded sleeves having splined engagement with said shaft, saw guide members, said sleeves being rotatably connected to one saw guide member and having threaded engagement with the adjacent saw guide member, tension members connected to the outer saw guide members of the unit, and means for simultaneously actuating said tension members with the rotation of said shaft for imparting an outward pull to the saw guide members as the shaft is actuated to separate the saw guide members and an inward thrust when the shaft is actuated in the opposite direction.

22. The combination with a plurality of band saws, and saw guide units comprising saw guide members, a shaft having a plurality of threaded sleeves in splined relation thereto rotatably engaged with one saw guide member of the unit and having threaded engagement with the adjacent saw guide member, a reversely threaded member disposed in parallel relation to said shaft and synchronously driven therewith, and tension members on said reversely threaded shaft connected to the outer guide members of the unit.

23. The combination of a plurality of band saws, opposed pairs of saw guide units disposed to coact with the reaches of the saws and comprising saw guide members slotted to receive the saws, a splined main shaft and a reversely threaded auxiliary shaft disposed in parallel relation, a cross bar to which the central guide member of the unit is fixed, the other guide members having slidable engagement with the cross bar, sleeves having splined engagement with said splined shaft and rotatable engagement with one guide member and threaded engagement with an adjacent guide member, tension members connected to the outer of the unit guide members and having threaded engagement with said reversely threaded shaft, a driving connection for said shafts, the ratio of the pitch of the threads on said threaded shaft and on said sleeves and the driving connections being proportional, an axially adjustable threaded bearing sleeve for the reversely threaded shaft of one of the said units, the pitch of the threads being in ratio to the pitch of the threads of the reversely threaded shaft, and driving connections for the main shaft to the said bearing sleeve whereby the unit is longitudinally adjusted relative to the opposed unit of the pair simultaneously with the spacing adjustment of the guide members.

24. The combination of a plurality of band saws, opposed pairs of saw guide units disposed to coact with the reaches of the saws and comprising saw guide members slotted to receive the saws, a splined main shaft and a reversely threaded auxiliary shaft disposed in parallel relation, a cross bar to which the central guide member of the unit is fixed, the other guide members having slidable engagement with the cross bar, sleeves having splined engagement with said splined shaft and rotatable engagement with one guide member and threaded engagement with an adjacent guide member, tension members connected to the outer of the unit guide members and having threaded engagement with said reversely threaded shaft, an axially adjustable threaded bearing sleeve for the reversely threaded shaft of one of the said units, and driving connections for the main shaft to the said bearing sleeve whereby the unit is longitudinally adjusted relative to the opposed unit of the pair simultaneously with the spacing adjustment of the guide members.

25. The combination of a plurality of band saws, opposed pairs of saw guide units disposed to coact with the reaches of the saws and comprising saw guide members, a splined main shaft and a reversely threaded auxiliary shaft disposed in parallel relation, sleeves having splined engagement with said splined shaft and rotatable engagement with one guide member and threaded engagement with an adjacent guide member, the central guide member being relatively fixed, tension members connected to the outer of the unit guide members and having threaded engagement with said reversely threaded shaft, a driving connection for said shafts, a bearing sleeve for the reversely threaded shaft of one of the said units threaded for longitudinal adjustment, the pitch of the threads and the driving connection being proportional, and driving connections for the main shaft to the said bearing sleeve whereby the unit is longitudinally adjusted simultaneously with the spacing adjustment of the guide members.

26. In a structure of the class described, the combination of opposed saw guide units, each comprising a splined main shaft and a reversely threaded shaft disposed in parallel relation, a cross bar with which said guide members are associated, the central guide members being fixed to the cross bar and the other guide members being slidable relative thereto, sleeves having splined engagement with said main shaft and rotatable engagement with one of said guide members and threaded engagement with an adjacent guide member, tension members connected to the outer of the unit members and having threaded engagement with said reversely threaded shaft, means for simultaneously rotating said main and auxiliary shafts of both units, and a threaded means actuated upon the rotation of said shafts for longitudinally moving one of the units relative to the other.

27. In a structure of the class described, the combination of opposed saw guide units, each comprising a splined main shaft and a reversely threaded shaft disposed in parallel relation, sleeves having splined engagement with said main shaft and rotatable engagement with one of said guide members and threaded engagement with an adjacent guide member, tension members connected to the outer of the unit members and having threaded engagement with said reversely threaded shaft, means for simultaneously rotating said main and auxiliary shafts of both units, and a threaded means actuated upon the rotation of said shafts for longitudinally moving one of the units relative to the other.

28. In a structure of the class described, the combination of opposed saw guide units, each comprising a splined main shaft and a reversely threaded shaft disposed in parallel relation, sleeves having splined engagement with said main shaft and rotatable engagement with one of said guide members and threaded engagement with an adjacent guide member, tension members connected to the outer of the unit members and having threaded engagement with said reversely threaded shaft, and means for simultaneously rotating said main and auxiliary shafts of both units.

29. The combination of a plurality of band saws, cylindrical driving and supporting pulleys for said band saws and with which said saws are associated to permit the saws being moved axially of the pulleys, opposed pairs of saw guide units each comprising saw guide members, the central members of the units being fixed and the members at each side thereof being adjustable relative to the central member and to each other, threaded means for simultaneously and uniformly adjusting the spacing of said saw guide members of the unit relative to each other, and threaded means for longitudinally adjusting one unit simultaneously with the adjustment of the spacing adjustment of said guide members.

30. The combination of a plurality of band saws, cylindrical driving and supporting pulleys for said band saws and with which said saws are associated to permit the saws being moved axially of the pulleys, opposed pairs of saw guide units each comprising saw guide members, the central members of the units being fixed and the members at each side thereof being adjustable relative to the central member and to each other, means for uniformly adjusting the spacing of said saw guide members of the unit relative to each other, and means for longitudinally adjusting one unit relative to the other.

31. The combination of a plurality of saws, opposed pairs of saw guide units coacting with said saws and comprising a plurality of saw guide members, the central member of each unit being relatively fixed, the other members being adjustable relative thereto and to each other, a shaft, sleeves having splined engagement with said shaft and rotatable engagement with one guide member and threaded engagement with an adjacent guide member, a threaded means for longitudinally adjusting one unit relative to the other, and driving connections for the shaft to said threaded means for longitudinally adjusting the unit whereby it is longitudinally adjusted simultaneously with the spacing adjustment of the guide members.

32. In a structure of the class described, the combination of a plurality of band saws, opposed saw guide units for the reaches of said saws, each comprising a plurality of saw guide members, the central member of the units being fixed and the other members being capable of spacing adjustment, means for simultaneously and uniformly adjusting the movable saw guide members of both units, and means for longitudinally adjusting one unit relative to the other simultaneously with the spacing adjustment of the guide members whereby the relatively fixed members of the two units are adjusted relative to each other in the same degree as the movable members of the pairs are adjusted relative to each other.

33. In a structure of the class described, the combination of a plurality of saws, opposed saw guide units, each comprising a plurality of saw guide members, the central member of the units being fixed and the other members being capable of spacing adjustment, means for uniformly adjusting the movable saw guide members of both units, and means for adjusting one unit relative to the other whereby the relatively fixed members of the two units may be adjusted relative to each other.

34. In a structure of the class described, a multiple saw guide unit comprising a shaft, threaded sleeves having splined engagement with said shaft, and threaded saw guide members in axially spaced relation on said shaft, said sleeves each being non-threadedly rotatable relative to a given one of said guide members and having a portion fixed thereon in two-way axial thrust engagement with said given guide member, said sleeves having the threaded portion thereof in engagement with the threaded portion of the adjacent saw guide member, whereby the guide members are simultaneously and positively actuated in either axial direction upon rotation of the shaft and sleeves.

35. The combination with a plurality of band saws, saw guide units comprising saw guide members, and a shaft having a plurality of threaded sleeves in splined relation thereto, said sleeves having a portion fixedly connected thereto provided with opposed faces in two-way axial thrust engagement with one saw guide member of the unit, said sleeves having the threaded portion thereof threadedly connected with the adjacent saw guide member, whereby said guide members are simultaneously actuated positively in either axial direction upon rotation of the shaft and sleeves.

36. In a slicing machine the combination of a plurality of band saws and guide elements disposed to coact with reaches of the band saws to guide and space the same comprising a series of annular supporting members each integrally carrying a guide element and each having an internally threaded portion and an annular grooved portion, of a series of flanged adjusting rings mounted in alternation with the supporting members, each adjusting ring having threads in its periphery to correspond to the internal threading of a supporting member so as to mesh therewith means carried by the adjusting rings and extending into the grooves of the supporting members respectively, means for rotating the adjusting rings simultaneously, and means for securing the supporting members against rotation.

KURT W. KUBAN.